W. J. AND M. E. RUSSELL.
CAMP TABLE.
APPLICATION FILED MAR. 24, 1919.
1,335,704.
Patented Mar. 30, 1920.
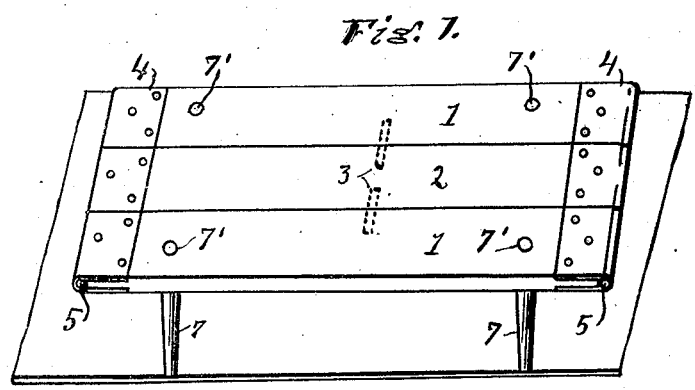
Fig. 1.
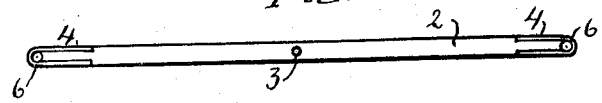
Fig. 2.
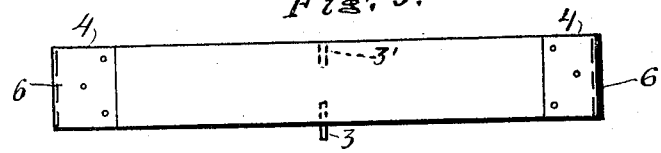
Fig. 3.
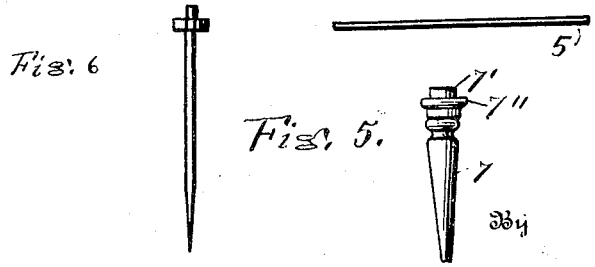
Fig. 4.
Fig. 6
Fig. 5.
Inventors
William J. Russell
Mary E. Russell
By Ithiel J. Cilley
Attorney

UNITED STATES PATENT OFFICE.

WILLIAM J. RUSSELL AND MARY E. RUSSELL, OF GRAND RAPIDS, MICHIGAN.

CAMP-TABLE.

1,335,704.  Specification of Letters Patent.  Patented Mar. 30, 1920.

Application filed March 24, 1919. Serial No. 285,686.

*To all whom it may concern:*

Be it known that we, WILLIAM J. RUSSELL and MARY E. RUSSELL, citizens of the United States, residing at Grand Rapids, in the county of Kent and State of Michigan, have invented certain new and useful Improvements in Camp-Tables, of which the following is a specification.

Our invention relates to improvements in tables for carrying with, and using upon automobile excursions, and other occasions, and its objects are: first, to provide a firm, substantial camping table that may be readily assembled whenever and wherever needed; second, to provide a table of the class named that may be readily taken apart and stored in an automobile, or other desired place, in the smallest possible space; and, third, to provide a table of the class named that may be extended indefinitely for use with large or small automobile, or picnic parties, as desired.

We attain these objects by the construction and combination of parts shown in the accompanying drawing, in which Figure 1 is a perspective of a three piece table to show the manner of assembling it. Fig. 2 is an edge view, and Fig. 3 is a plan of one of the leaves or fillers that are used to form the top of the table. Fig. 4 indicates the rod with which the ends of the table are locked together, and Fig. 5 shows a practical form of leg for use with the table. Fig. 6 shows a modified form of leg.

Similar numerals indicate similar parts throughout the several views where shown.

In the construction of this table we make use of several narrow leaves or fillings, 1, 2, 1, each of which has a metal end folded and secured thereon to form openings, as 6, through which the rods 5 may be passed to unite the fillings and form a strong, rigid construction at both ends of the table. These fillers are, also, preferably, provided with dowel pins and holes as indicated at 3—3' by means of which the centers of the fillers may be strengthened so one filler cannot be bent below the other filler by reason of great weight being placed upon one filler and lesser weight being placed upon an adjacent filler.

With this table, any available form of leg, as 7, may be used, but we greatly prefer to have the legs provided with strengthening shoulders, as indicated at 7" in Fig. 5, so that when the upper end, 7', of the leg is passed through the hole in the table tops or fillings, the breadth of the shoulder, at 7", will provide a bearing sufficiently firm and rigid to avert any danger of the table being made to weave or swing upon its legs, especially when heavily loaded.

It will be readily understood that with this line of construction it is a simple matter to provide tables of various lengths by simply carrying a number of the fillings 2, to use between the end pieces 1, and various lengths of the supporting rods 5 so any emergency that may arise upon a long automobile ride, may be readily provided for, so far as table necessities are concerned, without the necessity of over encumbering the automobile.

In Fig. 6 we have shown a form of leg that we find very advantageous where it is possible to force the legs into the ground, especially where we desire to set the table upon uneven ground where it may be necessary to force some of the legs farther into the ground than others, and we find this form very advantageous even upon level ground as with them forced into the ground the table is held much more firmly in place under a load than would be possible if the legs were stood loosely upon the surface of the ground. In fact, we use this leg for all out of doors use where practical, on account of its being more substantial and rigid, but upon hard surfaces, as floors, etc., we prefer the style shown in Fig. 5.

What we claim as new in the art, is:

1. In a camp table, a number of narrow fillings, metal end members on said fillings forming a continuous opening entirely across each end of each filling, rods passed through said openings firmly connecting the fillings the entire length of the table, and legs temporarily connected with the table.

2. In camp table construction, a number of long narrow strips of filling, metal members folded and secured to each end of the filling sections forming a continuous opening the entire width of each filling, metal rods passed through these openings forming continuous supports the entire length of the assembled table, central supporting pins in each table section, legs temporarily connected with the outer table sections and having supporting shoulders thereon to contact with the surface of the sections.

3. In a camp table, a number of narrow sections having continuous openings formed by folding sheet metal plates across each end thereof, a metal rod passed through said openings at each side of the table the entire length thereof, and readily removable therefrom, said rods forming strengthening elements across the entire ends of the table sections when assembled, and legs connected with the outer sections of the table and having broad supporting shoulders thereon, said legs readily assembled upon and removed from the table.

Signed at Grand Rapids, Michigan, March 22, 1919.

WILLIAM J. RUSSELL.
MARY E. RUSSELL.